3,230,271
METHOD OF PURIFYING NAPHTHALENE
Claude E. Bole, Gary, Ind., and Gerald Gilbert, San Francisco, Calif., assignors to United States Steel Corporation, a corporation of New Jersey
No Drawing. Filed Nov. 27, 1964, Ser. No. 414,400
1 Claim. (Cl. 260—674)

This is a continuation-in-part of our application Serial No. 48,582, filed August 10, 1960, now abandoned.

This invention relates to a method of purifying crude naphthalene and, more particularly, to a method for recovering "phthalic-grade" naphthalene (crystallizing point 76–79° C.) in high yield from crude tar distillate.

Naphthalene for use in the production of phthalic anhydride must be of high purity, particularly in respect to contamination by sulfur compounds and olefinic resin-forming compounds. It has been proposed to produce such high-purity product by treatment of crude naphthalene in liquid phase with peracetic acid (United States Patent No. 2,779,722). Another method of treatment which has been proposed is to blow air through the naphthalene heated to its boiling point (British Patent No. 505,742).

We have discovered that crude naphthalene may be purified to a high degree by treating it in liquid phase with ozone. The crude naphthalene to be purified may be dissolved in a solvent such as benzene, toluene or xylene or may be heated above its melting point. The ozone, diluted in air or oxygen, is bubbled through or otherwise brought in contact with the liquid, preferably in the presence of dilute sulfuric acid. The ozone has a selective action on olefinic compounds and sulfur compounds, particularly thianaphthene, resulting in products from which relatively pure naphthalene may be separated by distillation after hydrolysis. By our invention, we are able to remove up to 80% of the sulfur and from 98 to 100% of the olefins present in crude naphthalene, while decomposing any objectionable ozonides which may form. The invention may also be applied to the light oil from the distillation of coal tar.

A complete understanding of the invention may be obtained from the following detailed explanation of several typical examples of the practice thereof.

*Example I*

The crude tar distillate treated had the following composition: 61.5% naphthalene, 1.0% sulfur, 2.7% tar bases, 2.0% tar acids, and a bromine number of 12.04 grams bromine per 100 grams sample. The distillate was dissolved in toluene to the extent of 39% by weight, and cooled to 0° C. Other solvents such as benzene or xylene may also be used. Dilute sulphuric acid (3.3% by weight) was added to the solution, to the extent of about 40% by weight of distillate. An oxygen stream containing 4.73 weight percent ozone was bubbled through the dark brown solution at a rate of 4.2 grams ozone per hour. During the ozone addition the mixture was stirred continuously and cooled in an ice bath to control the temperature at 0° C. until a ratio of 0.27 mole ozone per .481 mole naphthalene was combined or a molar ratio of .56 ozone to naphthalene. The ozonized sample was hydrolyzed by heating (at 80° C.) for two hours with 20% sulfuric acid (by weight). Peracetic acid may be used instead of sulfuric in the hydrolysis (see Example IV). The hydrolyzed sample was washed with aqueous 10% sodium hydroxide and the toluene solvent was stripped from the raffinate by a simple distillation. The product was distilled through a 4-foot by 20-millimeter Fenske packed column to obtain the naphthalene product. The recovery was 84.3% of the starting material and the product had a crystallizing point of 78° C. Analysis of the purified naphthalene (pale yellow in color) gave these results: bromine number, 0.1; tar acids, 0.2% (as phenol); tar bases, 0.008% (as pyridine); and sulfur content, 0.12%.

*Example II*

A toluene solution containing 39% by weight of the same crude distillate was treated as above using a ratio of 0.155 mole ozone combined per .481 mole naphthalene or a molar ratio .322 ozone to naphthalene. The naphthalene recovery was 84.3%, and the light yellow product had the following properties: crystallizing point, 78° C.; tar acids, 0.24%; tar bases, 0.008%; bromine number, 0.12; and sulfur 0.34%.

*Example III*

A 50% by weight soluene solution of the same crude distillate was treated in a similar manner, except at 25° C., using a ratio of 0.1 mole ozone combined per .481 mole naphthalene, or a molar ratio of .21 ozone to naphthalene. Distillation of the ozonized sample yielded 89.2% of the available naphthalene as a light yellow product having the following properties: tar acids content, 0.2%; tar bases, 0.24%; bromine number 0.25; sulfur, 0.60% and crystallizing point, 77.1° C.

*Example IV*

The crude tar distillate treated had the following composition: 61.5% naphthalene; 1.0% sulfur; 2.7% tar bases, 2.0% tar acids; and a bromine number of 12.04 grams bromine per 100 grams sample. The distillate was dissolved in toluene to the extent of 39.0% by weight, and cooled to 0° C. Other solvents such as benzene or xylene may also be used. An oxygen stream containing 4.73 weight percent ozone was bubbled through the dark brown solution at a rate of 3.36 grams ozone per hour. During the ozone addition the mixture was stirred continuously and cooled in an ice bath to control the temperature at 0° C. until a ratio of 0.124 mole ozone per 0.386 mole naphthalene was combined or a molar ratio of 0.32 ozone to naphthalene. The ozonized sample was hydrolyzed by heating (at 48° C.) for 20 minutes with 40.0% peracetic acid (by weight). The hydrolyzed sample was washed with aqueous 10.0% sodium hydroxide and the toluene solvent was stripped from the raffinate by a simple distillation. The product was also distilled by simple distillation to obtain the naphthalene product. The recovery was 91.8% of the starting material and the product had a crystallizing point of 73° C. Analysis of the purified naphthalene (pale yellow in color) gave these results: bromine number, 0.2; tar bases, 0.06% (as pyridine); and sulfur content, 0.04%.

The invention has the advantage of providing a simple process for upgrading crude fractions of coal tar to obtain products having low sulfur content and containing no olefinic contamination. More specifically, the invention provides an efficient process for the recovery, from crude naphthalene distillates, of purified phthalic-grade naphthalene (i.e., naphthalene having a crystallizing point within the range of 76 to 79° C.), essentially free from olefinic resin-forming compounds. The invention also provides for the removal of 80% of the sulfur-bearing contaminants and effects a naphthalene recovery of about 85% or better.

While we have disclosed herein the preferred embodiment of our invention, we intend to cover as well any change or modification therein which may be made without departing from the spirit and scope of the invention.

We claim:

A method of purifying the naphthalene content of the distillate of tar which comprises dissolving the distillate in a solvent selected from the group consisting of benzene, toluene and xylene adding dilute sulfuric acid to the solution, bringing into contact with the solution a gas containing oxygen and about 5% ozone by weight, continuing such contact until from 0.2 to 0.6 mole ozone has combined per mole naphthalene, acidifying the solution and heating it until hydrolyzed then distilling the solution and recovering the purified naphthalene.

References Cited by the Examiner

UNITED STATES PATENTS 3,016,401  1/1962  Sturrock et al. _____ 260—674

OTHER REFERENCES

Bailey et al.: Ozonolysis of Naphthalene, Journal of Organic Chemistry, volume 22, page 1008, 1957.

DELBERT E. GANTZ, *Primary Examiner.*

ALPHONSO D. SULLIVAN, *Examiner.*